(12) United States Patent
Robbin et al.

(10) Patent No.: US 7,710,394 B2
(45) Date of Patent: *May 4, 2010

(54) METHOD AND APPARATUS FOR USE OF ROTATIONAL USER INPUTS

(75) Inventors: Jeffrey L. Robbin, Los Altos, CA (US); Steve Jobs, Palo Alto, CA (US); Philip W. Schiller, Half Moon Bay, CA (US)

(73) Assignee: Apple Inc., Cupertino, CA (US)

(*) Notice: Subject to any disclaimer, the term of this patent is extended or adjusted under 35 U.S.C. 154(b) by 672 days.

This patent is subject to a terminal disclaimer.

(21) Appl. No.: 11/610,384

(22) Filed: Dec. 13, 2006

(65) Prior Publication Data
US 2007/0080938 A1    Apr. 12, 2007

Related U.S. Application Data

(63) Continuation of application No. 10/259,159, filed on Sep. 26, 2002, now Pat. No. 7,345,671.

(60) Provisional application No. 60/346,237, filed on Oct. 22, 2001, provisional application No. 60/359,551, filed on Feb. 25, 2002, provisional application No. 60/387,692, filed on Jun. 10, 2002.

(51) Int. Cl.
*G09G 5/00* (2006.01)
*G06F 3/041* (2006.01)
*G06F 3/033* (2006.01)
*G06F 3/048* (2006.01)
*G06F 3/14* (2006.01)

(52) U.S. Cl. ............... 345/156; 345/173; 345/184; 345/684; 715/829; 715/830; 715/864

(58) Field of Classification Search ............... 345/684, 345/156, 173, 184; 715/784, 829, 830, 864
See application file for complete search history.

(56) References Cited

U.S. PATENT DOCUMENTS 1,061,578 A    5/1913    Wischhusen et al.

(Continued)

FOREIGN PATENT DOCUMENTS

CN    1139235    1/1997

(Continued)

OTHER PUBLICATIONS

U.S. Appl. No. 10/256,716, entitled "Method and Apparatus for Accelerated Scrolling", filed Sep. 26, 2002.

(Continued)

*Primary Examiner*—Bipin Shalwala
*Assistant Examiner*—Ilana Spar
(74) *Attorney, Agent, or Firm*—Morrison & Foerster LLP

(57) ABSTRACT

Improved approaches for users of computing devices to interact with graphical user interfaces are described. According to one aspect, a rotational user action supplied by a user at a user input device is transformed into linear action with respect to a graphical user interface. According to another aspect, a portion of an extended list of items is displayed by a graphical user interface and, through rotational user actions at a user input device, the portion of the list being displayed can be varied with welcomed ease of use. Although the type of computing device can vary, the improved approaches are particularly well-suited for use with a portable media player.

12 Claims, 9 Drawing Sheets

U.S. PATENT DOCUMENTS

| | | |
|---|---|---|
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,293,734 A | 10/1981 | Pepper, Jr. |
| D264,969 S | 6/1982 | McGoutry |
| 4,380,007 A | 4/1983 | Steinegger |
| 4,380,040 A | 4/1983 | Posset |
| 4,475,008 A | 10/1984 | Doi et al. |
| 4,570,149 A | 2/1986 | Thornburg et al. |
| 4,587,378 A | 5/1986 | Moore |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,831,359 A | 5/1989 | Newell |
| 4,849,852 A | 7/1989 | Mullins |
| 4,856,993 A | 8/1989 | Maness et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,495,566 A | 2/1996 | Kwatinetz |
| 5,508,703 A | 4/1996 | Okamura et al. |
| 5,543,588 A | 8/1996 | Bisset et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,893 A | 12/1996 | Gaughan et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A * | 5/1997 | Posso et al. ............... 341/22 |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,825,351 A | 10/1998 | Tam |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A * | 5/1999 | Kishi ..................... 341/20 |
| 5,907,152 A | 5/1999 | Dandiliker et al. |
| 5,907,318 A | 5/1999 | Medina |
| 5,909,211 A | 6/1999 | Combs et al. |
| 5,914,706 A | 6/1999 | Kono |
| 5,923,388 A | 7/1999 | Kurashima et al. |
| D412,940 S | 8/1999 | Kato et al. |

| | | |
|---|---|---|
| 5,943,044 A | 8/1999 | Martinelli et al. |
| 5,953,000 A | 9/1999 | Weirich |
| 5,956,019 A | 9/1999 | Bang et al. |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,122,526 A | 9/2000 | Parulski et al. |
| 6,124,587 A | 9/2000 | Bidiville |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| D448,810 S | 10/2001 | Goto |
| 6,297,795 B1 | 10/2001 | Kato et al. |
| 6,297,811 B1 | 10/2001 | Kent et al. |
| D450,713 S | 11/2001 | Masamitsu et al. |
| 6,314,483 B1 | 11/2001 | Goto et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerphelde |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,587,091 B2 | 7/2003 | Serpa |
| 6,606,244 B1 | 8/2003 | Liu et al. |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,664,951 B1 | 12/2003 | Fujii et al. |
| 6,677,927 B1 | 1/2004 | Bruck et al. |
| 6,686,904 B1 | 2/2004 | Sherman et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,844,872 B1 | 1/2005 | Farag et al. |
| 6,865,718 B2 | 3/2005 | Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,977,808 B2 | 12/2005 | Lam et al. |
| 6,978,127 B1 | 12/2005 | Bulthuis et al. |
| 7,006,077 B1 | 2/2006 | Uusimäki |
| 7,046,230 B2 | 5/2006 | Zadesky et al. |
| 7,069,044 B2 | 6/2006 | Okada et al. |
| 7,084,856 B2 | 8/2006 | Huppi |
| 7,113,196 B2 | 9/2006 | Kerr |
| 7,119,792 B1 | 10/2006 | Andre et al. |
| 7,215,319 B2 | 5/2007 | Kamijo et al. |
| 7,233,318 B2 | 6/2007 | Farag et al. |
| 7,236,154 B1 | 6/2007 | Kerr et al. |
| 7,253,643 B1 | 8/2007 | Seguine |
| 7,279,647 B2 | 10/2007 | Philipp |
| 7,310,089 B2 | 12/2007 | Baker et al. |
| 7,312,785 B2 | 12/2007 | Tsuk et al. |
| 7,395,081 B2 | 7/2008 | Bonnelykke Kristensen et al. |
| 7,397,467 B2 | 7/2008 | Park et al. |
| 7,466,307 B2 | 12/2008 | Trent et al. |
| 7,502,016 B2 | 3/2009 | Trent, Jr. et al. |
| 2001/0011991 A1 | 8/2001 | Wang et al. |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0045960 A1 | 4/2002 | Phillips et al. |
| 2002/0071550 A1 | 6/2002 | Pletikosa |
| 2002/0089545 A1 | 7/2002 | Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0180701 A1 | 12/2002 | Hayama et al. |

| | | |
|---|---|---|
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2004/0027341 A1 | 2/2004 | Derocher |
| 2004/0080682 A1 | 4/2004 | Dalton |
| 2004/0109357 A1 | 6/2004 | Cernea et al. |
| 2004/0156192 A1 | 8/2004 | Kerr et al. |
| 2004/0178997 A1 | 9/2004 | Gillespie et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0030048 A1 | 2/2005 | Bolender |
| 2005/0052425 A1 | 3/2005 | Zadesky et al. |
| 2005/0052429 A1 | 3/2005 | Philipp |
| 2005/0083299 A1 | 4/2005 | Nagasaka |
| 2005/0083307 A1 | 4/2005 | Aufderheide |
| 2005/0104867 A1 | 5/2005 | Westerman et al. |
| 2005/0110768 A1 | 5/2005 | Marriott et al. |
| 2005/0140657 A1 | 6/2005 | Park et al. |
| 2005/0156881 A1 | 7/2005 | Trent et al. |
| 2005/0162402 A1 | 7/2005 | Watanachote |
| 2005/0204309 A1 | 9/2005 | Szeto |
| 2006/0026521 A1 | 2/2006 | Hotelling et al. |
| 2006/0032680 A1 | 2/2006 | Elias et al. |
| 2006/0097991 A1 | 5/2006 | Hotelling et al. |
| 2006/0131156 A1 | 6/2006 | Voelckers |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0284836 A1 | 12/2006 | Philipp |
| 2007/0013671 A1 | 1/2007 | Zadesky et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0242057 A1 | 10/2007 | Zadesky et al. |
| 2007/0247421 A1 | 10/2007 | Orsley et al. |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036734 A1 | 2/2008 | Forsblad et al. |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0111795 A1 | 5/2008 | Bollinger |
| 2008/0284742 A1 | 11/2008 | Prest |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0141046 A1 | 6/2009 | Rathnam et al. |
| 2009/0179854 A1 | 7/2009 | Weber et al. |
| 2009/0197059 A1 | 8/2009 | Weber et al. |
| 2009/0229892 A1 | 9/2009 | Fisher et al. |

FOREIGN PATENT DOCUMENTS

| | | |
|---|---|---|
| CN | 1455615 | 11/2003 |
| CN | 1499356 | 5/2004 |
| DE | 3615742 | 11/1987 |
| DE | 19722636 | 3/1998 |
| DE | 10022537 | 11/2000 |
| DE | 20019074 U1 | 2/2001 |
| EP | 0178157 | 4/1986 |
| EP | 0419145 A1 | 3/1991 |
| EP | 0498540 A2 | 1/1992 |
| EP | 0 521 683 | 1/1993 |
| EP | 0674288 A1 | 9/1995 |
| EP | 0 731 407 A1 | 9/1996 |
| EP | 0 551 778 B1 | 1/1997 |
| EP | 0880091 A2 | 11/1998 |
| EP | 1026713 A1 | 8/2000 |
| EP | 1 081 922 A2 | 3/2001 |
| EP | 1 098 241 A2 | 5/2001 |
| EP | 1 133 057 | 9/2001 |
| EP | 1 162 826 | 12/2001 |
| EP | 1 168 396 | 1/2002 |
| EP | 1 205 836 A2 | 5/2002 |
| EP | 1 244 053 | 9/2002 |
| EP | 1 251 455 A2 | 10/2002 |
| EP | 1 467 392 | 10/2004 |
| EP | 1 482 401 | 12/2004 |
| EP | 1 496 467 | 1/2005 |
| EP | 1 542 437 A2 | 6/2005 |
| EP | 1 589 407 | 10/2005 |
| EP | 1 841 188 | 10/2007 |
| FR | 2 686 440 A1 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2 402 105 | 12/2004 |
| JP | 55-174009 | 6/1982 |
| JP | 57-95722 | 6/1982 |
| JP | 05-36623 | 5/1983 |
| JP | 05-233141 | 9/1983 |
| JP | 61-117619 | 6/1986 |
| JP | 61-124009 | 6/1986 |
| JP | 61-164547 | 1/1988 |
| JP | 63-106826 | 5/1988 |

| | | | | | | |
|---|---|---|---|---|---|---|
| JP | 63-181022 | 7/1988 | | JP | 10-320322 | 12/1998 |
| JP | 63-298518 | 12/1988 | | JP | 10-326149 | 12/1998 |
| JP | 03-57617 | 6/1991 | | JP | 11-24834 | 1/1999 |
| JP | 3-192418 | 8/1991 | | JP | 11-184607 | 7/1999 |
| JP | 04-32920 | 2/1992 | | JP | 11-194863 | 7/1999 |
| JP | 5-041135 | 2/1993 | | JP | 11-194872 | 7/1999 |
| JP | 5-101741 | 4/1993 | | JP | 11-194883 | 7/1999 |
| JP | 05080938 A | 4/1993 | | JP | 11-203045 | 7/1999 |
| JP | 5-36623 | 5/1993 | | JP | 1998-12010 | 7/1999 |
| JP | 5-189110 | 7/1993 | | JP | 1998-12025 | 7/1999 |
| JP | 5-205565 | 8/1993 | | JP | 1998-12026 | 7/1999 |
| JP | 5-211021 | 8/1993 | | JP | 1998-12027 | 7/1999 |
| JP | 5-217464 | 8/1993 | | JP | 1998-12028 | 7/1999 |
| JP | 5-233141 | 9/1993 | | JP | 1998-12029 | 7/1999 |
| JP | 05-262276 | 10/1993 | | JP | 11-212725 | 8/1999 |
| JP | 5-265656 | 10/1993 | | JP | 11-272378 | 10/1999 |
| JP | 5-274956 | 10/1993 | | JP | 1998-89535 | 10/1999 |
| JP | 05-289811 | 11/1993 | | JP | 11-338628 | 12/1999 |
| JP | 5-298955 | 11/1993 | | JP | 2000-215549 | 8/2000 |
| JP | 5-325723 | 12/1993 | | JP | 2000-267786 | 9/2000 |
| JP | 06-20570 | 1/1994 | | JP | 2000-267797 | 9/2000 |
| JP | 06-208433 | 2/1994 | | JP | 2000-353045 | 12/2000 |
| JP | 6-084428 | 3/1994 | | JP | 2001-11769 | 1/2001 |
| JP | 6-089636 | 3/1994 | | JP | 2001-22508 | 1/2001 |
| JP | 6-96639 | 4/1994 | | JP | 03-57617 | 6/2001 |
| JP | 06-096639 | 4/1994 | | JP | 2001-184158 | 7/2001 |
| JP | 06-111685 | 4/1994 | | JP | 3085481 | 2/2002 |
| JP | 6-111695 | 4/1994 | | JP | 2002-215311 | 8/2002 |
| JP | 6-139879 | 5/1994 | | JP | 2003280807 | 2/2003 |
| JP | 06-187078 | 7/1994 | | JP | 2003-517674 | 5/2003 |
| JP | 6-267382 | 9/1994 | | JP | 2004-362097 | 12/2004 |
| JP | 06-283993 | 10/1994 | | JP | 2005-99635 | 9/2005 |
| JP | 6-333459 | 12/1994 | | JP | 2005-133824 | 10/2005 |
| JP | 07-107574 | 4/1995 | | JP | 2005-134953 | 10/2005 |
| JP | 7-107574 | 4/1995 | | JP | 2005-235579 | 1/2006 |
| JP | 07-107574 A | 4/1995 | | JP | 2005-358970 | 7/2006 |
| JP | 07-41882 | 7/1995 | | JP | 3852854 | 9/2006 |
| JP | 7-41882 | 7/1995 | | JP | 3852854 | 12/2006 |
| JP | 7-201249 | 8/1995 | | JP | 2005-312433 | 5/2007 |
| JP | 07-201256 | 8/1995 | | KR | 1998-71394 | 10/1998 |
| JP | 07-253838 | 10/1995 | | KR | 1999-50198 | 7/1999 |
| JP | 7-261899 | 10/1995 | | KR | 2000-8579 | 2/2000 |
| JP | 07-261899 | 10/1995 | | KR | 2001-0052016 | 6/2001 |
| JP | 7-261922 | 10/1995 | | KR | 2002-65059 | 8/2002 |
| JP | 07-296670 | 11/1995 | | TW | 431607 | 4/2001 |
| JP | 07-319001 | 12/1995 | | TW | 00470193 | 12/2001 |
| JP | 08-016292 | 1/1996 | | TW | 547716 | 8/2003 |
| JP | 8-115158 | 5/1996 | | TW | 1220491 | 8/2004 |
| JP | 08-115158 | 5/1996 | | WO | WO94/17494 | 8/1994 |
| JP | 8-203387 | 8/1996 | | WO | WO-95/00897 A1 | 1/1995 |
| JP | 8-293226 | 11/1996 | | WO | WO-96/27968 | 9/1996 |
| JP | 8-298045 | 11/1996 | | WO | WO98/14863 | 4/1998 |
| JP | 08-299541 | 11/1996 | | WO | WO99/49443 | 9/1999 |
| JP | 8-316664 | 11/1996 | | WO | WO-01/44912 | 6/2001 |
| JP | EP-0551778 B1 | 1/1997 | | WO | WO-03/044645 | 5/2003 |
| JP | 9-044289 | 2/1997 | | WO | WO-03/044956 | 5/2003 |
| JP | 9-069023 | 3/1997 | | WO | WO-03/088176 | 10/2003 |
| JP | 09-128148 | 5/1997 | | WO | WO-03/090008 | 10/2003 |
| JP | 9-134248 | 5/1997 | | WO | WO-2004/040606 | 5/2004 |
| JP | 9-218747 | 8/1997 | | WO | WO-2004/091956 | 10/2004 |
| JP | 09-230993 | 9/1997 | | WO | WO-2005/055620 | 6/2005 |
| JP | 9-230993 | 9/1997 | | WO | WO-2005/076117 | 8/2005 |
| JP | 9-231858 | 9/1997 | | WO | WO-2005/114369 | 12/2005 |
| JP | 09-233161 | 9/1997 | | WO | WO-2005/124526 | 12/2005 |
| JP | 9-251347 | 9/1997 | | WO | WO-2006/020305 | 2/2006 |
| JP | 9-258895 | 10/1997 | | WO | WO-2006/021211 | 3/2006 |
| JP | 9-288926 | 11/1997 | | WO | WO-2006/037545 | 4/2006 |
| JP | 9-512979 | 12/1997 | | WO | WO-2006/104745 | 10/2006 |
| JP | 10-74127 | 3/1998 | | WO | WO-2006/135127 | 12/2006 |
| JP | 10-074429 | 3/1998 | | WO | WO-2007/025858 | 3/2007 |
| JP | 10-198507 | 7/1998 | | WO | WO-2007/078477 | 7/2007 |
| JP | 10-227878 | 8/1998 | | | | |
| JP | 10-240693 | 9/1998 | | | | |

| | | |
|---|---|---|
| WO | WO-2007/084467 | 7/2007 |
| WO | WO-2008/045414 | 4/2008 |

OTHER PUBLICATIONS

U.S. Appl. No. 11/610,181, entitled "Method and Apparatus for Accelerated Scrolling", filed Dec. 13, 2006.
U.S. Appl. No. 11/610,190, entitled "Method and Apparatus for Accelerated Scrolling", filed Dec. 13, 2006.
U.S. Appl. No. 10/259,159, entitled "Method and Apparatus for Use of Rotational User Inputs", filed Sep. 26, 2002.
U.S. Appl. No. 11/610,376, entitled "Method and Apparatus for Use of Rotational User Inputs," filed Dec. 13, 2006.
David H. Ahl, "Controller Update", Creative Computing vol. 9, No. 12, Dec. 1983.
"Atari VCS/2600 Peripherals", www.classicgaming.com/gamingmuseum/2600p.html, downloaded Feb. 28, 2007, pp. 1-15.
Ahmad, "A Usable Real-Time 3D Hand Tracker," Proceedings of the 28th Asilomar Conference on Signals, Systems and Computers—Part 2 (of 2) vol. 2 (Oct. 1994).
Bray, "Phosphors help switch on xenon," Physics in Action, pp. 1-3, Apr. 1999.
Chinese Office Action issue Dec. 29, 2006, directed to CN Application No. 200510103886.3, 25 pages.
EVB Elektronik "TSOP6238 IR Receiver Modules for Infrared Remote Control Systems" dated Jan. 2004 1 page.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Luna Technologies International, Inc., Luna Photoluminescent Safety Products, "Photoluminescence-What is Photoluminescence?" from website at http://www.lunaplast.com/photoluminescence.com on Dec. 27, 2005.
SanDisk Sansa Connect User Guide; 29 pages.
"Touchpad," Notebook PC Manual, ACER Information Co. Ltd., Feb. 16, 2005, pp. 11-12.
Translation of Trekstor's Defense Statement to the District Court Mannheim of May 23, 2008; 37 pages.
"Diamond Multimedia Announces Rio PMP300 Portable MP3 Music Player," located at http://news.harmony-central.com/Newp/1998/Rio-PMP300.html visited on May 5, 2008. (4 pages).
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Robbin et al., U.S. Appl. No. 60/387,692 entitled "Method and Apparatus for Use of Rotational User Inputs," filed Jun. 10, 2002 (30003.00).
Robbin et al., U.S. Appl. No. 60/399,806 entitled "Graphical User Interface and Methods of Use Thereof in a Multimedia Player," filed Jul. 30, 2002.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404, filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
Third Party Observations Under Article 115 EPC for corresponding EP Application No. 02773855.8 dated Nov. 28, 2008; 13 pages.
EP Communication pursuant to Article 94(3) EPC for corresponding Application No. 02 773 855.8 dated Mar. 5, 2008; 7 pages.
International Search Report dated Oct. 16, 2003 directed to corresponding application No. PCT/US02/33861; 4 pages.
"Alps Electric introduces the GlidePoint Wave Keyboard; combines a gently curved design with Alps' advanced GlidePoint Technology", Business Wire (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
Bartimo, Jim, "The Portables: Traveling Quickly", Computerworld (Nov. 14, 1983).
Brink et al., "Pumped-up portables", U.S. News & World Report, 116(21) (May 30, 1994).
Brown et al., "Windows on Tablets as a Means of Achieving Virtual Input Devices", Human-Computer Interaction—Interact '90 (1990).
Buxton et al., "Issues and Techniques in Touch-Sensitive Tablet Input", Computer Graphics, 19(3), Proceedings of SIGGRAPH '85 (1985).
Chen et al., "A Study in Interactive 3-D Rotation Using 2-D Control Devices", Computer Graphics 22(4) (Aug. 1988).
Evans et al., "Tablet-based Valuators that Provide One, Two, or Three Degrees of Freedom", Computer Graphics 15(3) (Aug. 1981).
Jesitus, John , "Broken promises?", Industry Week/IW, 246(20) (Nov. 3, 1997).
Nass, Richard, "Touchpad input device goes digital to give portable systems a desktop "mouse-like" feel", Electronic Design, 44(18) (Sep. 3, 1996).
Perenson, Melissa, "New & Improved: Touchpad Redux", PC Magazine (Sep. 10, 1996).
Petruzzellis, "Force-Sensing Resistors" Electronics Now, 64(3) (Mar. 1993).
Sony presents "Choice Without Compromise" at IBC '97 M2 Presswire (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Tessler, Franklin, "Point Pad", Macworld 12(10) (Oct. 1995).
Tessler, Franklin, "Smart Input: How to Chose from the New Generation of Innovative Input Devices", Macworld 13(5) (May 1996).
Tessler, Franklin, "Touchpads", Macworld 13(2) (Feb. 1996).
Soderholm, Lars G., "Sensing Systems for 'Touch and Feel'", Design News (May 8, 1989), pp. 72-76.
Baig, E.C., "Your PC Just Might Need a Mouse", U.S. News & World Report 108(22) (Jun. 4, 1990).
Mims, Forrest M., III, "A Few Quick Pointers; Mouses, Touch Screens, Touch Pads, Light Pads, and The Like Can Make Your System Easier to Use", Computers & Electronics (22) (May 1984).
Petersen, Marty, "Koala Pad Touch Tablet & Micro Illustrator Software", InfoWorld (Oct. 10, 1983).

"Triax Custom Controllers due; Video Game Controllers", HFD-The Weekly Home Furnishing Newspaper, (67)(1) (Jan. 4, 1993).

Communication pursuant to Article 96(2) EPC for corresponding EP Application No. 02 776 261.6 dated Jun. 28, 2007.

"Apple Presents iPod Ultra-Portable MP3 Music Player Puts 1,000 Songs in Your Pocket", www.apple.com/pr/library/2001/oct/23ipod.html, downloaded Jun. 21, 2007, 3 pgs.

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1997) "Dynamic Soundscape: Mapping Time to Space for Audio Browsing," Computer Human Interaction, pp. 194-201.

Kobayashi et al. "Development of the Touch Switches with the Click Response," Koukuu Denshi Gihou No. 17: pp. 44-48 (Mar. 1994) (published by the Japan Aviation Electronics Industry, Ltd.); Translation of Summary.

Notification of Final Rejection for corresponding Korean Application No. 10-2004-7005119 dated Aug. 31, 2007.

"About Quicktip®" www.logicad3d.com/docs/qt.html, downloaded Apr. 8, 2002.

"Neuros MP3 Digital Audio Computer", www.neurosaudio.com., downloaded Apr. 9, 2003.

"OEM Touchpad Modules" website www.glidepoint.com/sales/modules.index.shtml, downloaded Feb. 13, 2002.

"Product Overview—ErgoCommander®", www.logicad3d.com/products/ErgoCommander.htm, downloaded Apr. 8, 2002.

"Product Overview—SpaceMouse® Classic", www.logicad3d.com/products/Classic.htm, downloaded Apr. 8, 2002.

"Synaptics Touch Pad Interfacing Guide" Second Edition, Mar. 25, 1998, Synaptics, Inc. San Jose, CA, pp. 1 to 90.

Bang & Olufsen Telecom a/s, "BeoCom 6000 User Guide 2000."

Chapweske, Adam, "PS/2 Mouse/Keyboard Protocol", 1999, http://panda.cs.ndsu.nodak.edu/~achapwes/PICmicro/PS2/ps2.htm.

Fiore, Andrew, "Zen Touchpad", Cornell University, May 2000.

Gadgetboy, "Point and click with the latest mice", CNETAsia Product Review, www.asia.cnet.com/reviews...are/gadgetboy/0,39001770,38023590,00.htm, downloaded Dec. 5, 2001.

Sylvania, "Intellivision™ Intelligent Television Master Component Service Manual," pp. 1, 2 and 8, 1979.

Tessler et al. "Touchpads Three new input devices", website www.macworld.com/1996/02/review/1806.html, download Feb. 13, 2002.

"Der Klangmeister," Connect Magazine, Aug. 1998.

Photographs of Innovations 2000 Best of Show award presented at the 2000 International CES Innovations 2000 Design & Engineering Showcase, 1 pg.

BeoCom 6000, Sales Training Brochure, date unknown.

Letter re: Bang & Olufsen A/S, by David Safran, Nixon Peabody, LLP, May 21, 2004.

U.S. Appl. No. 10/209,537, filed Jul. 30, 2002.

"Apple Unveils Optical Mouse and New Pro Keyboard," Press Release, Jul. 19, 2000.

"System Service and Troubleshooting Manual," www.dsplib.com/intv/Master, downloaded Dec. 11, 2002.

Kevin DeMeyer, "Crystal Optical Mouse," Feb. 14, 2002, Heatseekerz, Web-Article 19.

Communication pursuant to Article 96(2) EPC for corresponding EP Application No. 02 776 261.6 dated Apr. 13, 2006.

Notification of Reasons for Rejection for corresponding Japanese Application No. 2003-538879 dated Sep. 12, 2006.

Notification of Provision Rejection for corresponding Korean Application No. 10-2004-7005119 dated Aug. 29, 2006.

Tsuk et al., U.S. Office Action mailed Oct. 13, 2006, directed to U.S. Appl. No. 10/256,716; 16 pages.

Tsuk et al., U.S. Office Action mailed Aug. 3, 2006, directed to U.S. Appl. No. 10/256,716; 15 pages.

Tsuk et al., U.S. Office Action mailed Jan. 10, 2006, directed to U.S. Appl. No. 10/256,716; 12 pages.

Tsuk et al., U.S. Office Action mailed Jun. 24, 2005, directed to U.S. Appl. No. 10/256,716; 12 pages.

Tsuk et al., U.S. Office Action mailed Sep. 30, 2004, directed to U.S. Appl. No. 10/256,716; 11 pages.

Tsuk et al., U.S. Office Action mailed Jul. 7, 2009, directed to U.S. Appl. No. 11/610,190; 24 pages.

Robbin et al., U.S. Office Action mailed Jan. 18, 2007, directed to U.S. Appl. No. 10/259,159; 18 pages.

Robbin et al., U.S. Office Action mailed Oct. 13, 2006, directed to U.S. Appl. No. 10/259,159; 18 pages.

Robbin et al., U.S. Office Action mailed Aug. 3, 2006, directed to U.S. Appl. No. 10/259,159; 15 pages.

Robbin et al., U.S. Office Action mailed Jan. 11, 2006, directed to U.S. Appl. No. 10/259,159; 15 pages.

Robbin et al., U.S. Office Action mailed Jun. 16, 2005, directed to U.S. Appl. No. 10/259,159; 16 pages.

Robbin et al., U.S. Office Action mailed Sep. 30, 2004, directed to U.S. Appl. No. 10/259,159; 14 pages.

Zadesky et al., U.S. Office Action mailed Jul. 9, 2008, directed to U.S. Appl. No. 10/643,256; 12 pages.

Zadesky et al., U.S. Office Action mailed Dec. 12, 2007, directed to U.S. Appl. No. 10/643,256; 12 pages.

Zadesky et al., U.S. Office Action mailed Jul. 13, 2007, directed to U.S. Appl. No. 10/643,256; 13 pages.

Zadesky et al., U.S. Office Action mailed Mar. 23, 2007, directed to U.S. Appl. No. 10/643,256; 11 pages.

Zadesky et al., U.S. Office Action mailed Oct. 27, 2006, directed to U.S. Appl. No. 10/643,256; 14 pages.

Forsblad et al., U.S. Office Action mailed Jun. 25, 2009, directed to U.S. Appl. No. 11/355,022; 18 pages.

Forsblad et al., U.S. Office Action mailed Jan. 26, 2009, directed to U.S. Appl. No. 11/355,022; 15 pages.

Hotelling et al., U.S. Office Action mailed Jan. 27, 2009, directed to U.S. Appl. No. 11/882,421; 15 pages.

Zadesky et al., U.S. Office Action mailed Aug. 6, 2009, directed to U.S. Appl. No. 11/057,050; 30 pages.

Zadesky et al., U.S. Office Action mailed Feb. 20, 2009, directed to U.S. Appl. No. 11/057,050; 25 pages.

Zadesky et al., U.S. Office Action mailed Dec. 24, 2008, directed to U.S. Appl. No. 11/057,050; 25 pages.

Zadesky et al., U.S. Office Action mailed Nov. 26, 2008, directed to U.S. Appl. No. 11/057,050; 25 pages.

Zadesky et al, U.S. Office Action mailed Aug. 19, 2008, directed to U.S. Appl. No. 11/057,050; 23 pages.

Zadesky et al., U.S. Office Action mailed Nov. 20, 2007, directed to U.S. Appl. No. 11/057,050; 33 pages.

Zadesky et al., U.S. Office Action mailed Mar. 5, 2009, directed to U.S. Appl. No. 11/477,469; 12 pages.

Zadesky et al., U.S. Office Action mailed Jul. 30, 2004, directed to U.S. Appl. No. 10/188,182; 7 pages.

Zadesky et al., U.S. Office Action mailed Sep. 21, 2005, directed to U.S. Appl. No. 10/188,182; 10 pages.

Zadesky et al., U.S. Office Action mailed Mar. 4, 2004, directed to U.S. Appl. No. 10/188,182; 8 pages.

Zadesky et al., U.S. Office Action mailed Oct. 4, 2007, directed to U.S. Appl. No. 11/386,238; 12 pages.

Zadesky et al.., U.S. Office Action mailed Oct. 4, 2007, directed to U.S. Appl. No. 11/806,957; 14 pages.

Marriott et al., U.S. Office Action mailed Jan. 30, 2008, directed to U.S. Appl. No. 10/722,948; 17 pages.

Marriott et al., U.S. Office Action mailed Jul. 13, 2007, directed to U.S. Appl. No. 10/722,948; 15 pages.

Marriott et al., U.S. Office Action mailed Dec. 12, 2006, directed to U.S. Appl. No. 10/722,948; 14 pages.

Marriott et al., U.S. Office Action mailed Jun. 2, 2006, directed to U.S. Appl. No. 10/722,948; 12 pages.

Hotelling et al., U.S. Office Action mailed Jul. 24, 2009, directed to U.S. Appl. No. 11/483,008; 17 pages.

Hotelling et al., U.S. Office Action mailed Jul. 27, 2009, directed to U.S. Appl. No. 11/882,420; 17 pages.

Elias et al., U.S. Office Action mailed Aug. 4, 2009, directed to U.S. Appl. No. 11/203,692; 12 pages.

Elias et al., U.S. Office Action mailed Feb. 23, 2009, directed to U.S. Appl. No. 11/203,692; 13 pages.

Elias et al., U.S. Office Action mailed Sep. 17, 2008, directed to U.S. Appl. No. 11/203,692; 8 pages.

Tsuk et al., U.S. Office Action mailed Aug. 7, 2009, directed to U.S. Appl. No. 11/610,181; 20 pages.

Robbin et al., U.S. Office Action mailed Aug. 10, 2009, directed to U.S. Appl. No. 11/610,376; 11 pages.

Hotelling, U.S. Office Action mailed Sep. 1, 2009, directed to U.S. Appl. No. 11/482,286; 14 pages.

Lampell, U.S. Office Action mailed Sep. 15, 2009, directed to U.S. Appl. No. 11/530,807; 15 pages.

Boling, Douglas (1993) "Programming Microsoft Windows CE.NET," p. 109.

Ng et al., U.S. Office Action mailed Jan. 14, 2010, directed to U.S. Appl. No. 11/394,493; 20 pages.

Ng et al., U.S. Office Action mailed Jan. 15, 2010, directed to U.S. Appl. No. 11/882,423; 22 pages.

Tsuk et al., U.S. Office Action mailed Dec. 31, 2009, directed to U.S. Appl. No. 11/610,190; 25 pages.

Zadesky et al., U.S. Office Action mailed Feb. 4, 2010, directed to U.S. Appl. No. 11/477,469; 14 pages.

Hotelling, U.S. Office Action mailed Jan. 25, 2010, directed to U.S. Appl. No. 11/482,286; 17 pages.

* cited by examiner

METHOD AND APPARATUS FOR USE OF ROTATIONAL USER INPUTS

CROSS-REFERENCE TO RELATED APPLICATIONS

This application is a continuation of U.S. patent application Ser. No. 10/259,159, filed Sep. 26, 2002, and entitled "METHOD AND APPARATUS FOR USE OF ROTATIONAL USER INPUTS," which is hereby incorporated by reference herein, and which claims benefit of priority from: (i) U.S. Provisional Patent Application No. 60/346,237, filed Oct. 22, 2001, entitled "METHOD AND SYSTEM FOR LIST SCROLLING," and is hereby incorporated by reference herein; (ii) U.S. Provisional Patent Application No. 60/359,551, filed Feb. 25, 2002, entitled "TOUCH PAD FOR HANDHELD DEVICE," and is hereby incorporated by reference herein; and (iii) U.S. Provisional Patent Application No. 60/387,692, filed Jun. 10, 2002, entitled "METHOD AND APPARATUS FOR USE OF ROTATIONAL USER INPUTS," and is hereby incorporated by reference herein.

This application is also related to U.S. patent application Ser. No. 10/072,765, filed Feb. 7, 2002, and entitled "MOUSE HAVING A ROTARY DIAL," and hereby incorporated by reference herein.

BACKGROUND OF THE INVENTION

1. Field of the Invention

The present invention relates generally to a computing device and, more particularly, to a handheld computing device having a rotational input unit.

2. Description of the Related Art

There exist today many styles of input devices for performing operations with respect to a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into consideration when designing the consumer electronic device. In handheld computing devices, the input devices are typically buttons and switches. Buttons and switches are generally mechanical in nature and provide limited control with regard to the movement of a cursor (or other selector) and the making of selections. For example, they are generally dedicated to moving the cursor in a specific direction (e.g., arrow keys) or to making specific selections (e.g., enter, delete, number, etc.). In the case of handheld personal digital assistants (PDAs), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases, a dedicated portion of the touch pad may be tapped. In stationary devices such as desktop computers, the input devices are generally selected from keyboards, mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackball devices generally include one or more buttons for making selections on the display screen.

In addition to allowing input pointer movements and selections with respect to a Graphical User Interface (GUI) presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

Further, consumer electronic products other than computers, such as cordless telephones, stereo receivers and compact-disc (CD) players, have used dials to enable users to select a phone number, a radio frequency and a specific CD, respectively. Here, typically, a limited-resolution display is used together with the dial. The display, at best, displays only a single item (number, frequency or label) in a low resolution manner using a character generator LCD. In other words, these devices have used single line, low resolution LCD readouts.

Thus, there is always a need for improved user input devices that facilitate greater ease of use of computing devices.

SUMMARY OF THE INVENTION

The present invention relates to improved approaches for users of computing devices to interact with graphical user interfaces. According to one aspect of the invention, a rotational user action supplied by a user at a user input device is transformed into linear action with respect to a graphical user interface. According to another aspect of the invention, a portion of an extended list of items is displayed by a graphical user interface and, through rotational user actions at a user input device, the portion of the list being displayed can be varied with welcomed ease of use. Although the type of computing device can vary, the invention is particularly well-suited for use with a media player.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to improved approaches for users of computing devices to interact with graphical user interfaces. According to one aspect of the invention, a rotational user action supplied by a user at a user input device is transformed into linear action with respect to a graphical user interface. According to another aspect of the invention, a portion of an extended list of items is displayed by a graphical user interface and, through rotational user actions at a user input device, the portion of the list being displayed can be varied with welcomed ease of use. Although the type of computing device can vary, the invention is particularly well-suited for use with a portable media player.

Other aspects of the invention will become apparent below. In any case, the aspects are not limiting and the various aspects of the invention can be used separately or in combination.

Embodiments of the invention are discussed below with reference to FIGS. 1A-6. However, those skilled in the art will readily appreciate that the detailed description given herein with respect to these figures is for explanatory purposes as the invention extends beyond these limited embodiments.

Figure 1A:
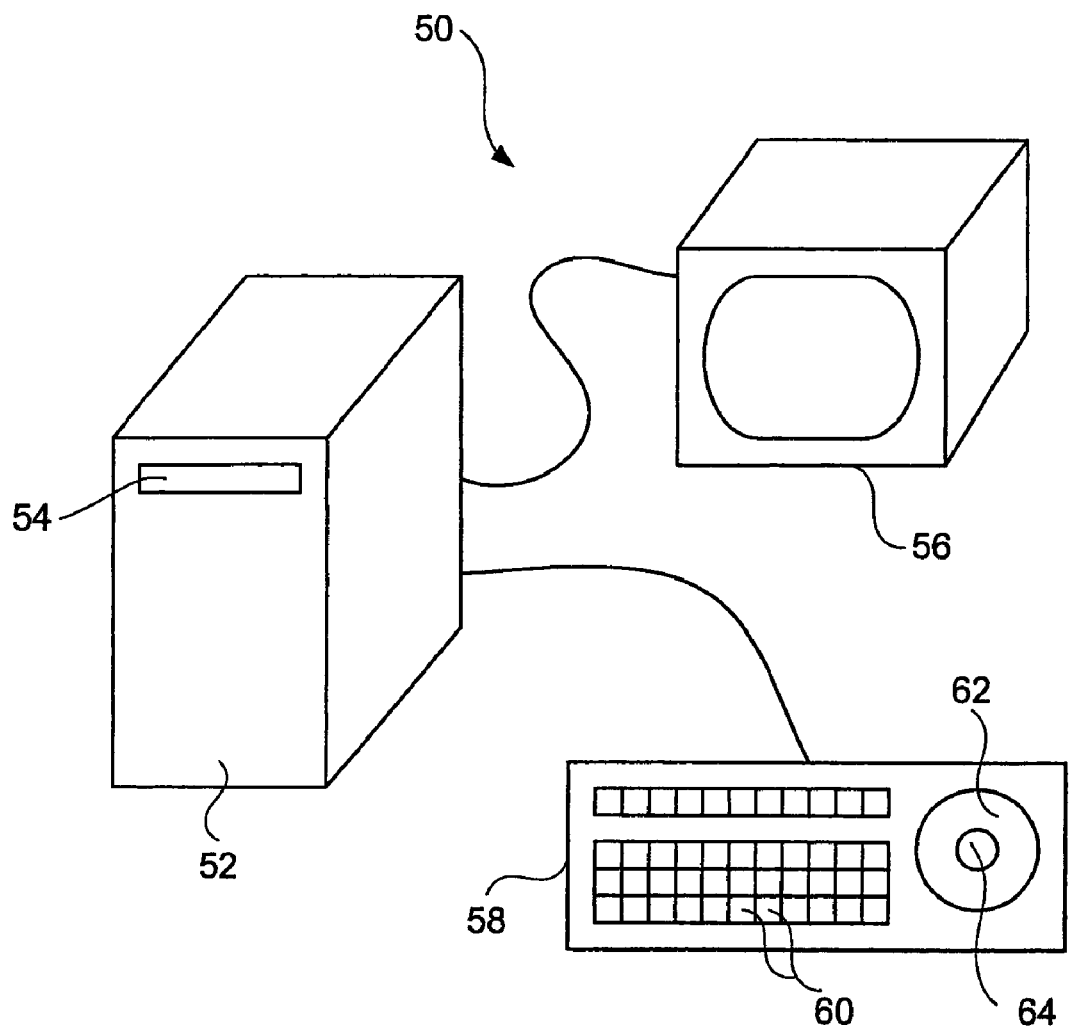
FIG. 1A is a perspective diagram of a computer system in accordance with one embodiment of the invention.

FIG. 1A is a perspective diagram of a computer system 50 in accordance with one embodiment of the invention. The computer system 50 includes a base housing 52 that encloses electronic circuitry that performs the computing operations for the computing system 50. Typically, the electronic circuitry includes a microprocessor, memory, I/O controller, graphics controller, etc. The housing 52 also provides a removable computer readable medium drive 54 in which a removable computer readable medium can be placed so as to electronically or optically read data therefrom. The computer housing 52 is also coupled to a display device 56 on which a screen display can be presented for a user of the computer system 50 to view. Still further, the computer system 50 includes a keyboard apparatus 58. The keyboard apparatus 58 allows a user to interact with a computer program (application program or operating system) performed by the computer system 50. In this regard, the keyboard apparatus 58 includes a plurality of keys 60 and a rotational input unit 62. The rotational input unit 62 allows a user to perform a rotational movement with respect to the rotational input unit 62. The rotational movement can then be processed by the electronic circuitry of the computer system 50 and used to manipulate navigation or selection actions with respect to a graphical user interface being presented to the user on the display device 56. The keyboard apparatus 58 can also include a button 64 associated with the rotational input unit 62. As shown in FIG. 1A, the button 64 can be provided at a center region of the rotational input unit 62. However, the button 64 can be placed elsewhere, such as outside the periphery of the rotational input unit 62.

Figure 1B:
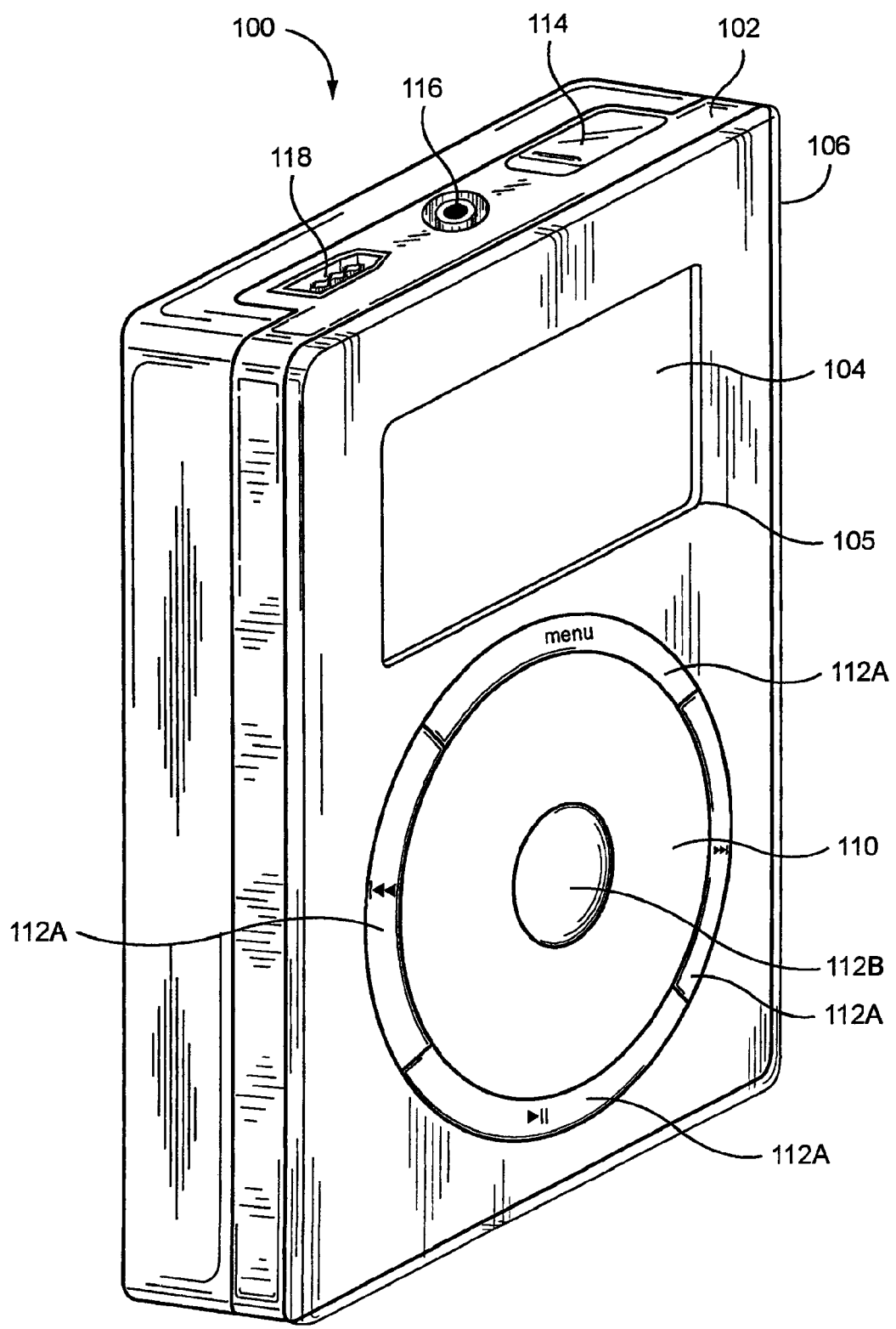
FIG. 1B is a perspective diagram of a media player in accordance with one embodiment of the present invention.

FIG. 1B is a perspective diagram of a media player 100 in accordance with one embodiment of the present invention. The term "media player" generally refers to computing devices that are dedicated to processing media such as audio, video or other images. In one implementation, the media player is a portable computing device. Examples of media players include music players, game players, video players, video recorders, cameras and the like. These computing devices are generally portable so as to allow a user to listen to music, play games or video, record video or take pictures wherever the user travels. In one embodiment, the media player is a handheld device that is sized for placement into a pocket of the user (i.e., pocket-sized). By being pocket-sized, the user does not have to directly carry the device and therefore the device can be taken almost anywhere the user travels (e.g., the user is not limited by carrying a large, bulky and often heavy device, as in a portable computer). For example, in the case of a music player (e.g., MP3 player), a user may use the device while working out at the gym. In the case of a camera, a user may use the device while mountain climbing. Furthermore, the device may be operated by the user's hands, no reference surface such as a desktop is needed. In one implementation, the music player can be pocket-sized and rather lightweight (e.g., dimensions of 2.43 by 4.02 by 0.78 inches and a weight of 6.5 ounces) for true portability.

The media player 100 typically has connection capabilities that allow a user to upload and download data to and from a host device such as a general purpose computer (e.g., desktop computer or portable computer). For example, in the case of a camera, photo images may be downloaded to the general purpose computer for further processing (e.g., printing). With regard to music players, songs and playlists stored on the general purpose computer may be downloaded into the music player. In one embodiment, the media player 100 can be a pocket-sized handheld MP3 music player that allows a user to store a large collection of music.

As shown in FIG. 1B, the media player 100 includes a housing 102 that encloses various electrical components (including integrated circuit chips and other circuitry) to provide computing capabilities for the media player 100. The integrated circuit chips and other circuitry may include a microprocessor, memory (e.g., ROM or RAM), a power source (e.g., a battery), a circuit board, a hard drive, and various input/output (I/O) support circuitry. In the case of music players, the electrical components may include components for outputting music such as an amplifier and a digital signal processor (DSP). In the case of video recorders or cameras, the electrical components may include components for capturing images such as image sensors (e.g., charge-coupled device (CCD) or complimentary oxide semiconductor (CMOS)) or optics (e.g., lenses, splitters, filters). The housing may also define the shape or form of the media player. That is, the contour of the housing 102 may embody the outward physical appearance of the media player 100.

The media player 100 also includes a display screen 104. The display screen 104 is used to display a Graphical User Interface (GUI) as well as other information to the user (e.g., text, objects, graphics). By way of example, the display screen 104 may be a liquid crystal display (LCD). In one particular embodiment, the display screen corresponds to a high-resolution display with a white LED backlight to give clear visibility in daylight as well as in low-light conditions. Additionally, according to one embodiment, the display screen 104 can be about 2 inches (measured diagonally) and provide a 160-by-128 pixel resolution. The display screen 104 can also operate to simultaneously display characters of multiple languages. As shown in FIG. 1B, the display screen 104 is visible to a user of the media player 100 through an opening 105 in the housing 102, and through a transparent wall 106 that is disposed over the opening 105. Although transparent, the transparent wall 106 may be considered part of the housing 102 since it helps to define the shape or form of the media player 100.

The media player 100 includes a rotational input device 110. The rotational input device 110 receives a rotational input action from a user of the media player 100. The rotational input action is used to control one or more control functions for controlling or interacting with the media player 100 (or application operating thereon). In one embodiment, the control function corresponds to a scrolling feature. The direction of scrolling can vary depending on implementation. For example, scrolling may be implemented vertically (up or down) or horizontally (left or right). For example, in the case of a music player, the moving finger may initiate a control function for scrolling through a song menu displayed on the display screen 104. The term "scrolling" as used herein generally pertains to moving displayed data (e.g., text or graphics) across a viewing area on a display screen 104 so that a new item of data (e.g., line of text or graphics) is brought into view in the viewing area. In most cases, once the viewing area is full, each new item of data appears at the edge of the viewing area and all other sets of data move over one position. That is, the new item of data appears for each item of data that moves out of the viewing area. In essence, the scrolling function allows a user to view consecutive sets of data currently outside of the viewing area. The viewing area may be the entire viewing area of the display screen 104 or it may be only a portion of the display screen 104 (e.g., a window frame).

By way of example, in the case of a music player (e.g., MP3 player), the scrolling feature may be used to help browse through songs stored in the music player. To elaborate, the display screen 104, during operation, may display a list of media items (e.g., songs). A user of the media player 100 is able to linearly scroll through the list of media items by providing a rotational input action using the rotational input device 110. The displayed items from the list of media items are varied commensurate with the rotational input action such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by providing the rotational input action at greater speeds. The direction of the rotational input action may be arranged to control the direction of scrolling.

In addition to above, the media player 100 may also include one or more buttons 112. The buttons 112 are configured to provide one or more dedicated control functions for making selections or issuing commands associated with operating the media player 100. By way of example, in the case of a music player, the button functions may be associated with opening a menu, playing a song, fast forwarding a song, seeking through a menu and the like. In most cases, the button functions are implemented via a mechanical clicking action. The position of the buttons 112 relative to the rotational input device 110 may be widely varied. For example, they may be adjacent to one another or spaced apart. In the illustrated embodiment, the buttons 112 are configured to surround the inner and outer perimeter of the rotational input device 110. In this manner, the buttons 112 may provide tangible surfaces that define the outer boundaries of the rotational input device 110. As shown, there are four buttons 112A that surround the outer perimeter and one button 112B disposed in the center or middle of the rotational input device 110. By way of example, the plurality of buttons 112 may consist of a menu button, play/stop button, forward seek button, reverse seek button, and the like.

Moreover, the media player 100 may also include a power switch 114, a headphone jack 116 and a data port 118. The power switch 114 is configured to turn the media device 100 on and off. The headphone jack 116 is capable of receiving a headphone connector associated with headphones configured for listening to sound being outputted by the media device 100. The data port 118 is capable of receiving a data connector/cable assembly configured for transmitting and receiving data to and from a host device, such as a general purpose computer. By way of example, the data port 118 may be used to upload or download songs to and from the media device 100. The data port 118 may be widely varied. For example, the data port may be a PS/2 port, a serial port, a parallel port, a USB port, a FireWire port, and the like. In some cases, the data port 118 may be a radio frequency (RF) link or optical infrared (IR) link to eliminate the need for a cable. Although not shown in FIG. 1, the media player 100 may also include a power port that receives a power connector/cable assembly configured for delivering power to the media player 100. In some cases, the data port 118 may serve as both a data and a power port.

Figure 2A:
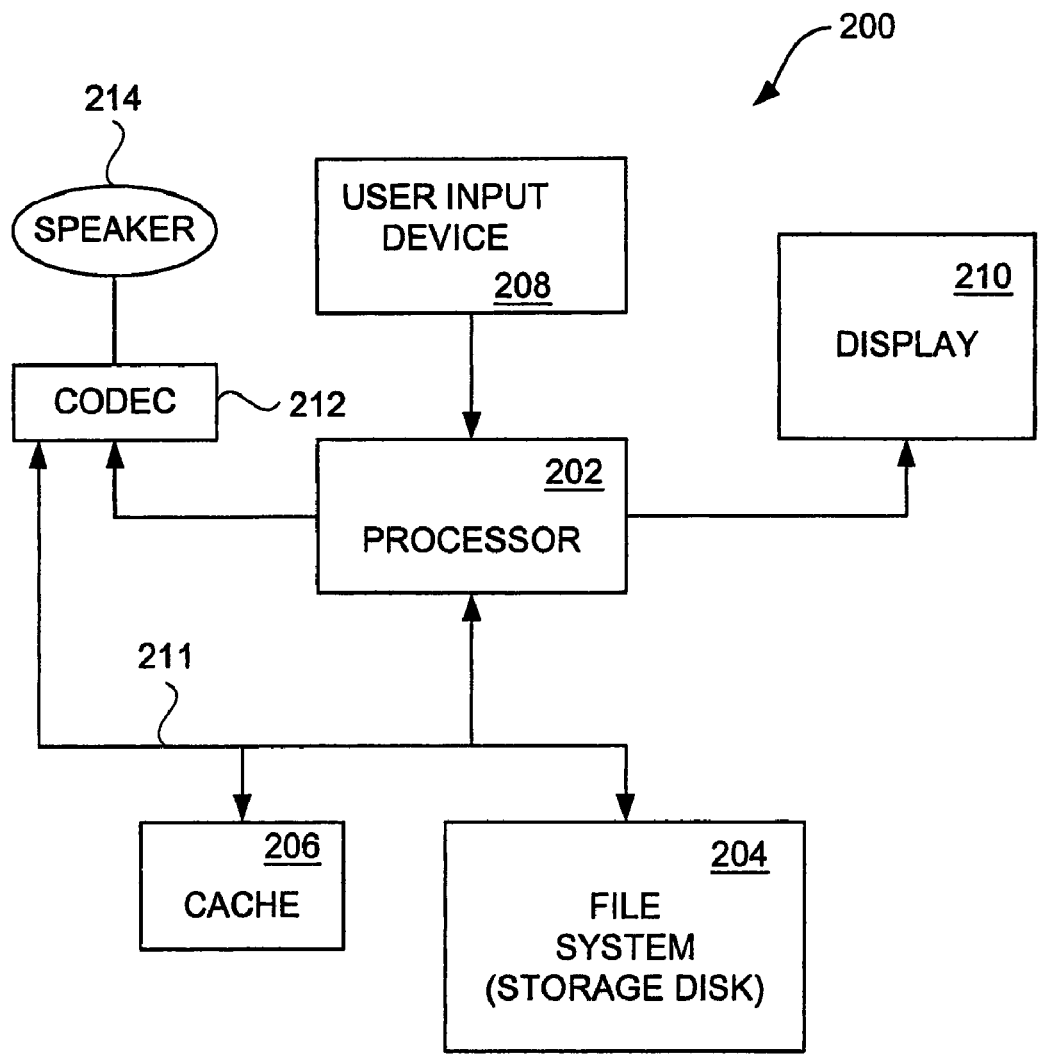
FIG. 2A is a block diagram of a media player according to one embodiment of the invention.

FIG. 2A is a block diagram of a media player 200 according to one embodiment of the invention. The media player 200 can, for example, represent internal components of the media player 100.

The media player 200 includes a processor 202 that pertains to a microprocessor or controller for controlling the overall operation of the media player 200. The media player 200 stores media data pertaining to media items in a file system 204 and a cache 206. The file system 204 is, typically, a storage disk or a plurality of disks. The file system typically provides high capacity storage capability for the media player 200. However, since the access time to the file system 204 is relatively slow, the media player 200 also includes a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown).

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 211 can facilitate data transfer between at least the file system 204, the cache 206, the processor 202, and the coder/decoder (CODEC) 212. The media player 200 can also include an audio feedback unit (not shown) to provide audio feedback for user interactions (such as with the user input device 208).

In one embodiment, the media player 200 serves to store a plurality of media items (e.g., songs) in the file system 204. When a user desires to have the media player play a particular media item, a list of available media items is displayed on the display 210. Then, using the user input device 208, a user can select one of the available media items. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

Figure 2B:
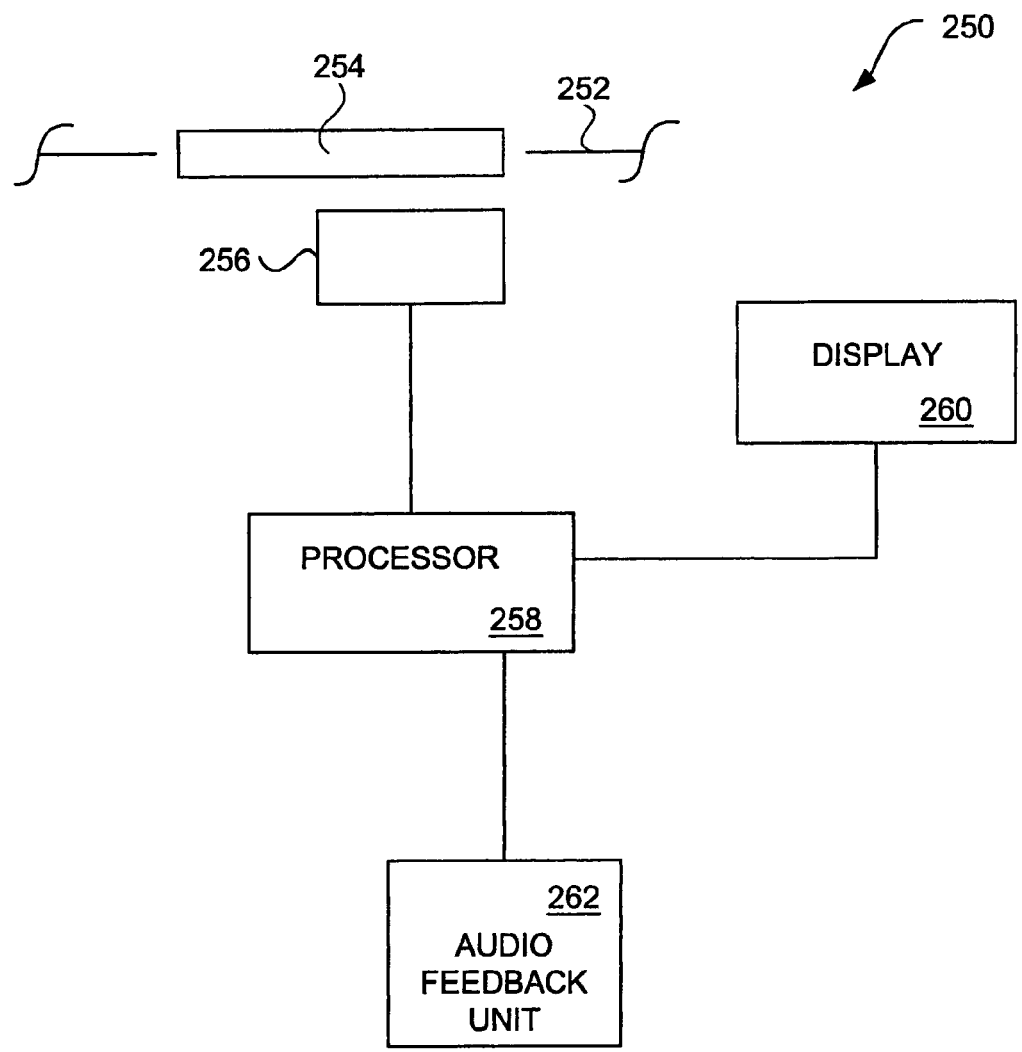
FIG. 2B is a block diagram of a computing system according to one embodiment of the invention.

FIG. 2B is a block diagram of a computing system 250 according to one embodiment of the invention. The computing system 250 can, for example, represent a portion of any of the computer system 50 shown in FIG. 1A, the media player 100 shown in FIG. 1B, or the media player 200 shown in FIG. 2A.

The computing system 250 includes a housing 252 that exposes a rotational input device 254. The housing 252 can be a computer's housing or an input/output device's housing. The rotational input device 254 permits a user to interact with the computing system 250 through a rotational action. The rotational action results from either rotation of the rotational input device 254 itself or rotation of a stylus or user's finger about the rotational input device 254. As examples, the rotational input device 254 can be a rotary dial (including, e.g., a navigational wheel or a scroll wheel) capable of being rotated or a touch pad capable of rotational sensing. A rotation pickup unit 256 couples to the rotational input device 254 to sense the rotational action. For example, the rotational pickup unit 256 can be optically or electrically coupled to the rotational input device 254.

The computing system 250 further includes a processor 258, a display 260 and an audio feedback unit 262. Signals pertaining to the rotational action are supplied to the processor 258. The processor 258 not only performs processing operations for application programs hosted by the computing system 250 but also can control the display 260 and the audio feedback unit 262. Alternatively, a specialized controller or other circuitry can support the processor 258 in controlling the display 260 or the audio feedback unit 262.

The processor 258 causes a display screen to be produced on the display 260. In one implementation, the display screen includes a selectable list of items (e.g., media items) from which a user may select one or more of the items. By the user providing a rotational action with respect to the rotational input device 254, the list can be scrolled through. The processor 258 receives the signals pertaining to the rotational action from the rotation pickup unit 256. The processor 258 then determines the next items of the list that are to be presented on a display screen by the display 260. In making this determination, the processor 258 can take into consideration the length of the list. Typically, the processor 258 will determine the rate of the rotational action such that the transitioning to different items in the media list can be performed at a rate proportional to the rate of the rotational action.

The processor 258 can also control the audio feedback unit 266 to provide audio feedback to a user. The audio feedback can, for example, be a clicking sound produced by the audio feedback unit 262. In one embodiment, the audio feedback unit 262 is a piezoelectric buzzer. As the rate of transitioning through the list of items increases, the frequency of the clicking sounds can increase. Alternatively, when the rate that the rotational input device 254 is turned slows, the rate of transitioning through the list of items decreases, and thus the frequency of the clicking sounds correspondingly slows. Hence, the clicking sounds provide audio feedback to the user as to the rate in which the items (i.e., media items) within the list of items are being traversed.

Figure 3:
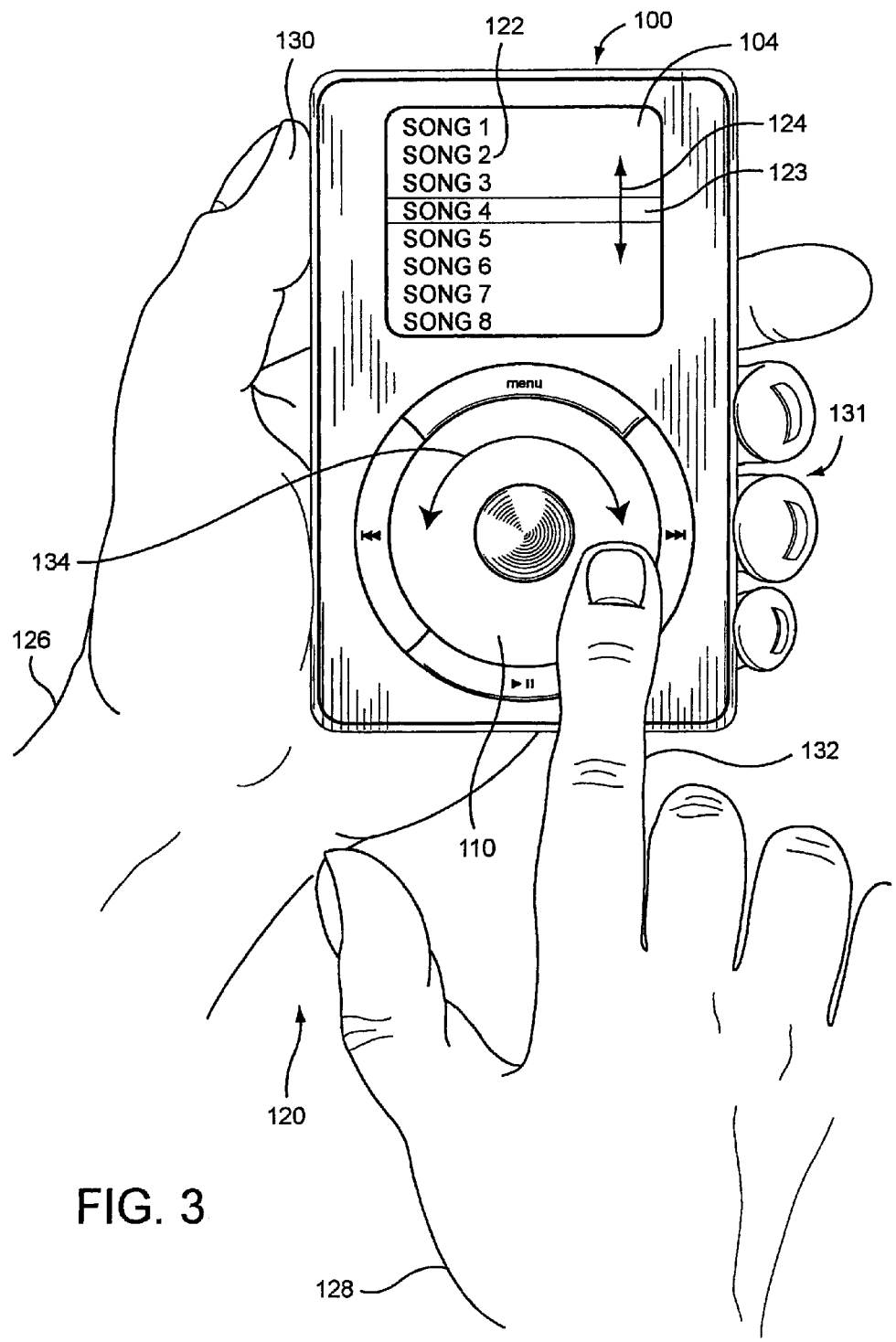
FIG. 3 shows the media player of FIG. 1B being used by a user in accordance with one embodiment of the invention.

FIG. 3 shows the media player 100 of FIG. 1B being used by a user 120 in accordance with one embodiment of the invention. In this embodiment, the user 120 is linearly scrolling (as shown by arrow 124) through a list of songs 122 displayed on the display screen 104 via a slider bar 123. As shown, the media device 100 is comfortably held in one hand 126 while being comfortably addressed by the other hand 128. This configuration generally allows the user 120 to easily actuate the rotational input device 110 with one or more fingers. For example, the thumb 130 and right-most fingers 131 (or left-most fingers if left handed) of the first hand 126 are used to grip the sides of the media player 100 while a finger 132 of the opposite hand 128 is used to actuate the rotational input device 110.

Referring to FIG. 3, and in accordance with one embodiment of the invention, the rotational input device 110 can be continuously actuated by a circular motion of the finger 132 as shown by arrow 134. For example, the finger may rotate relative to an imaginary axis. In particular, the finger can be rotated through 360 degrees of rotation without stopping. This form of motion may produce continuous or incremental scrolling through the list of songs 122 being displayed on the display screen 104.

Figure 4A:
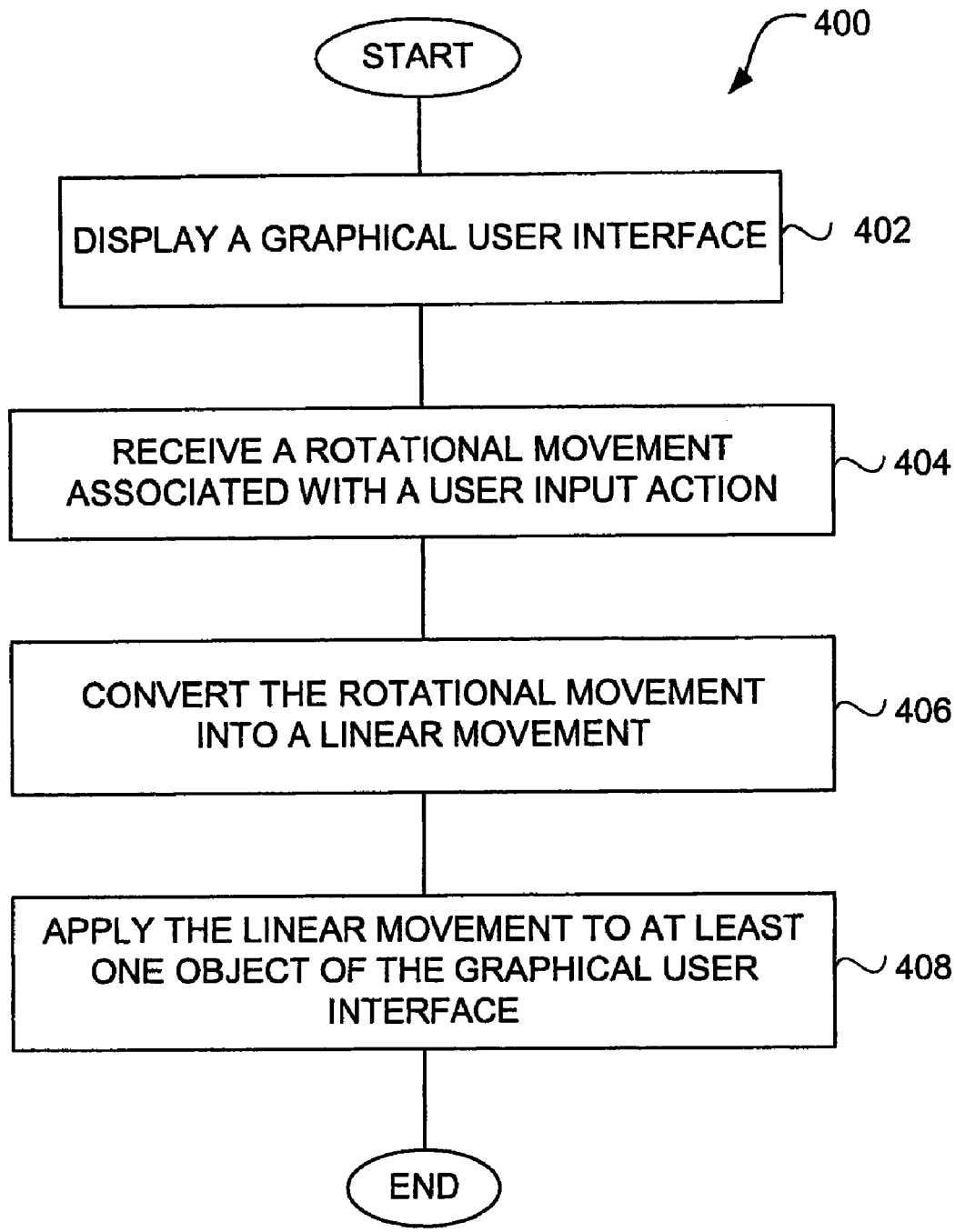
FIG. 4A is a flow diagram of user input processing according to one embodiment of the invention.

FIG. 4A is a flow diagram of user input processing 400 according to one embodiment of the invention. The user input processing 400 is, for example, performed with respect to the computer system 50 illustrated in FIG. 1A or the media player 100 illustrated in FIG. 1B.

The user input processing 400 displays 402 a graphical user interface. Then, a rotational movement associated with a user input action is received 404. Here, the user input action is generally angular, as opposed to linear, and thus pertains to a rotational movement. As discussed in more detail below, the rotational movement can be provided by the user input action. In one example, the rotational movement can be caused by a user acting to rotate a navigational wheel through a user input action. In another example, the rotational movement can be caused by a user's finger or a stylist being moved in a rotational manner through a user input action with respect to a touch pad. After the rotational movement has been received 404, the rotational movement is converted 406 into a linear movement. The linear movement is then applied 408 to at least one object of the graphical user interface. For example, the object of the graphical user interface can be a list, menu or other object having a plurality of selectable items. The linear movement can effect a scroll type action with respect to the object (e.g., list or menu). Alternatively, the linear movement can effect a level adjustment (e.g., volume adjustment). After the linear movement has been applied 408, the user input processing 400 is complete and ends.

Figure 4B:
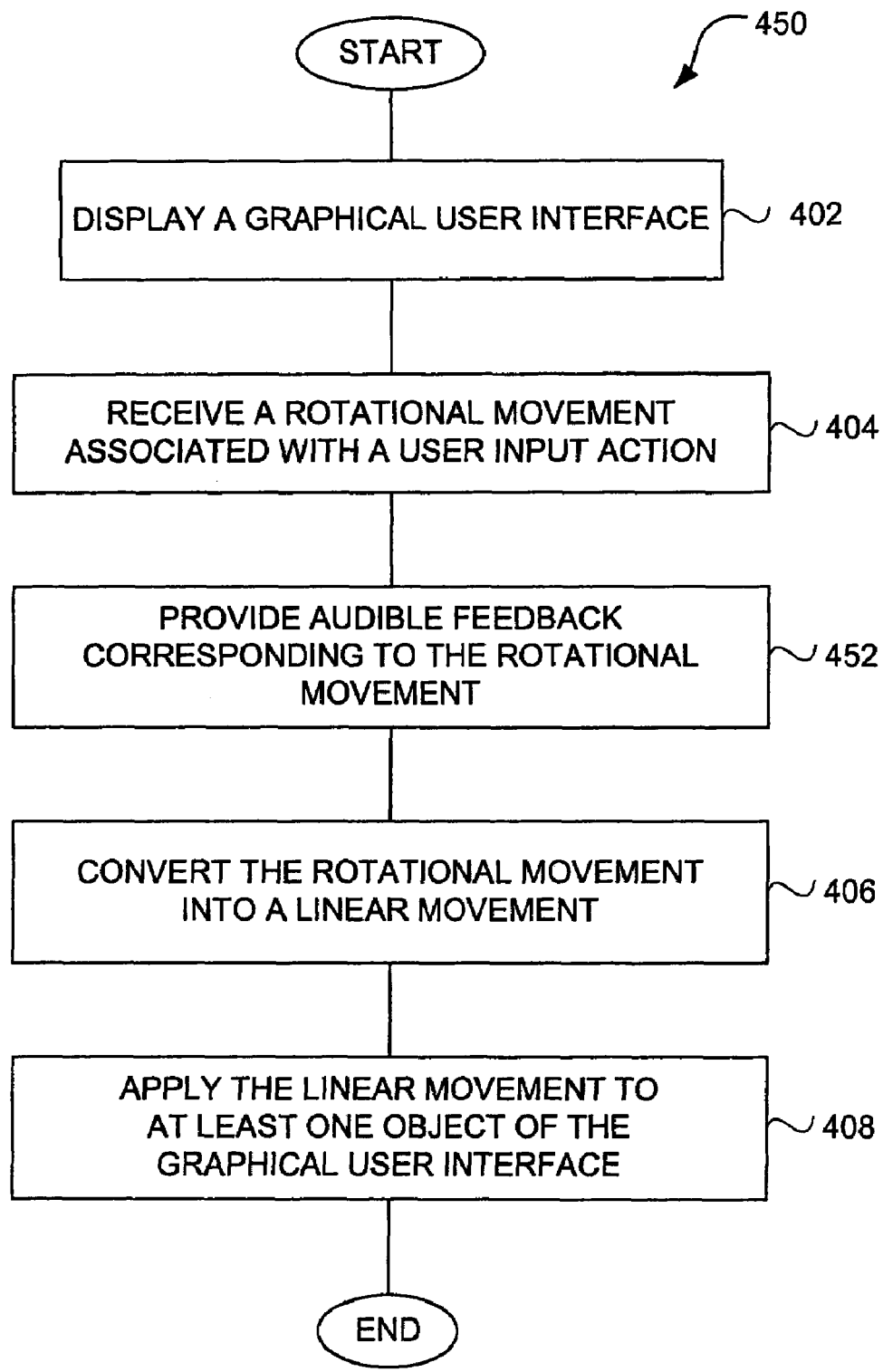
FIG. 4B is a flow diagram of user input processing according to another embodiment of the invention.

FIG. 4B is a flow diagram of user input processing 450 according to another embodiment of the invention. The user input processing 450 is, for example, performed with respect to the computer system 50 illustrated in FIG. 1A or the media player 100 illustrated in FIG. 1B.

The operations 402-408 performed by the user input processing 450 are similar to those like operations performed by the user input processing 400 illustrated in FIG. 4A. Additionally, the user input processing 450 operates to provide 452 audible feedback corresponding to the rotational movements. In other words, as the rotational movement associated with user input action is received 404, audible feedback corresponding to the rotational movement is provided 452. Such audible feedback provides the user with feedback concerning the extent to which rotational movement has been input. In one embodiment, the rotational movement associated with user input action is converted into linear movement and applied to an object of a graphical user interface. For example, when the object of the graphical user interface is a multi-item list that is displayed for user scrolling and selection actions, the rotational movement associated with the user input action represents a distance traversed in the multi-item list. In one embodiment, the audible feedback is provided through a piezoelectric buzzer that is controlled by a processor (or other circuitry). For example, the audio feedback unit 262 shown in FIG. 2B can be a piezoelectric buzzer. The controller for the piezoelectric buzzer can, for example, be a processor of the computer system 50 or the media player 100, or some other circuitry coupled to the piezoelectric buzzer.

Figure 5:
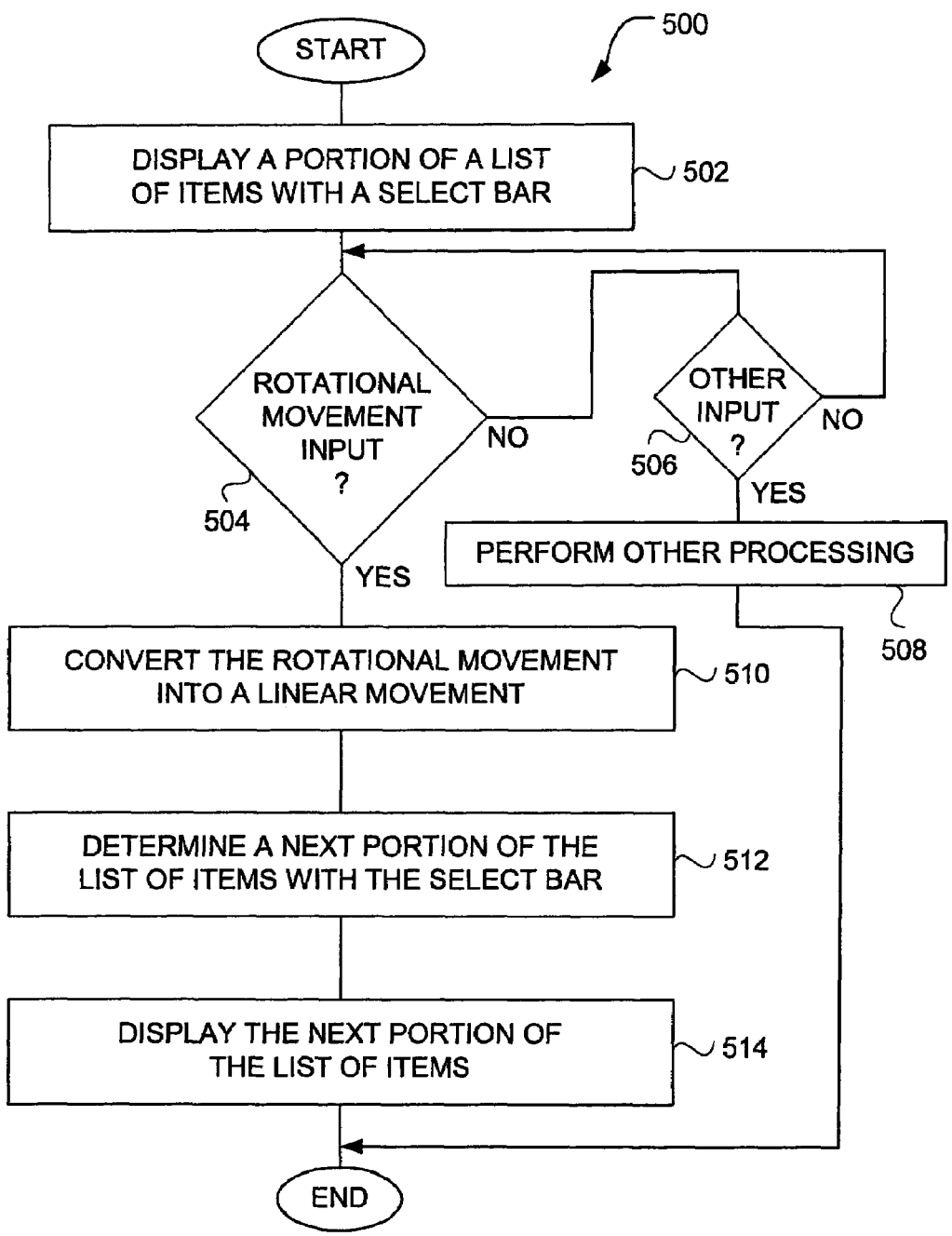
FIG. 5 is a flow diagram of user input processing according to another embodiment of the invention.

FIG. 5 is a flow diagram of user input processing 500 according to another embodiment of the invention. The user input processing 500 is, for example, performed by a computing device, such as the computer system 50 illustrated in FIG. 1A or the media player 100 illustrated in FIG. 1B.

The user input processing 500 begins by the display 502 of a portion of a list of items together with a select bar. The select bar typically points to or highlights one or more of the items of the list of items. In general, the select bar can be associated with any sort of visual indication specifying one or more of the items of the list of items. Hence, the select bar is one type of visual indicator. Next, a decision 504 determines whether a rotational movement input has been received. When the decision 504 determines that a rotational movement input has not yet been received, then a decision 506 determines whether another input has been received. Here, the inputs are provided by a user of the computing device performing or associated with the user input processing 500. When the decision 506 determines that another input has been received, then other processing is performed 508 to perform any operations or actions caused by the other input. Following the operation 508, the user input processing 500 is complete and ends. On the other hand, when the decision 506 determines that no other input has been received, then the user input processing 500 returns to repeat the decision 504.

Once the decision 504 determines that a rotational movement input has been received, then the rotational movement is converted 510 to a linear movement. Then, a next portion of the list of items (and placement of the select bar over one of the items) is determined 512. Thereafter, the next portion of the list of items is displayed 514. The linear movement operates to move the select bar (or other visual identifier) within the list. In other words, the select bar is scrolled upwards or downwards by the user in accordance with the linear motion. As the scrolling occurs, the portion of the list being displayed changes. Following the operation 514, the user input processing 500 is complete and ends. However, if desired, the user input processing 500 can continue following operation 514 by returning to the decision 504 such that subsequent rotational movement inputs can be processed to view other portions of the list items in a similar manner.

Figure 6:
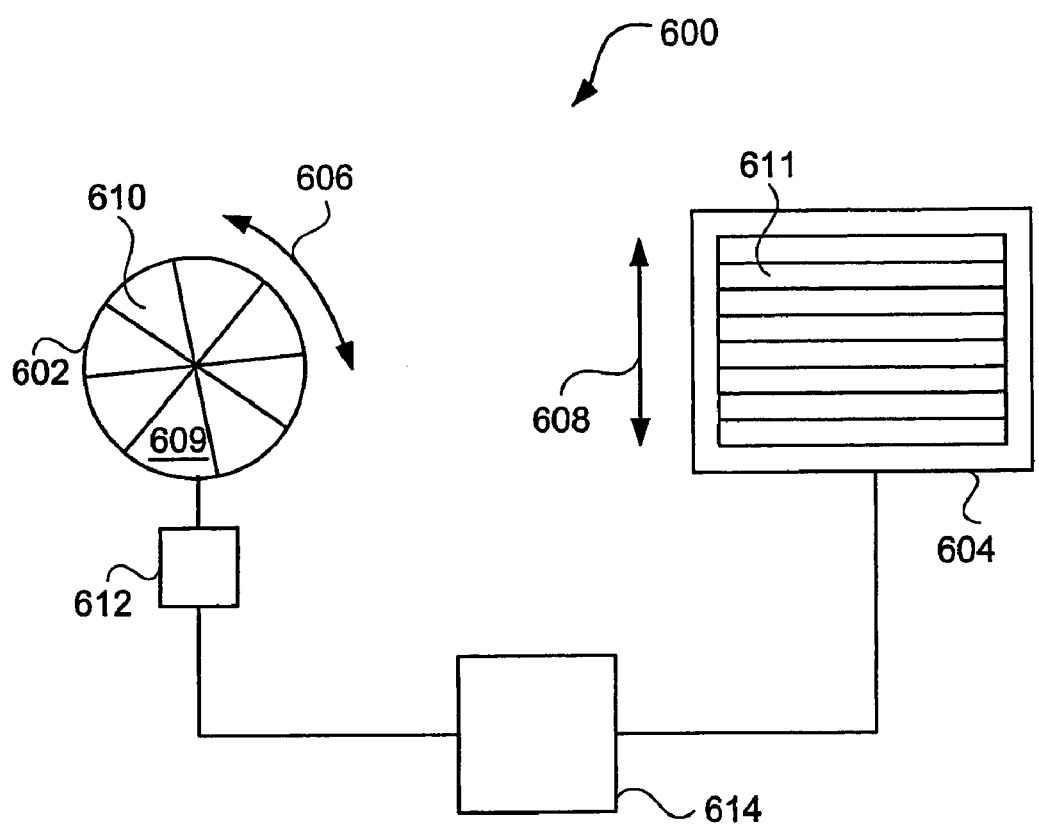
FIG. 6 is a block diagram of a rotary input display system in accordance with one embodiment of the invention.

FIG. 6 is a block diagram of a rotary input display system 600 in accordance with one embodiment of the invention. By way of example, the rotary input display system 600 can be performed by a computing device, such as the computer system 50 illustrated in FIG. 1A or the media player 100 illustrated in FIG. 1B. The rotary input display system 600 utilizes a rotational input device 602 and a display screen 604. The rotational input device 602 is configured to transform a rotational motion 606 by a user input action (e.g., a swirling or whirling motion) into translational or linear motion 608 on the display screen 604. In one embodiment, the rotational input device 602 is arranged to continuously determine either the angular position of the rotational input device 602 or the angular position of an object relative to a planar surface 609 of the rotational input device 602. This allows a user to linearly scroll through a media list 611 on the display screen 604 by inducing the rotational motion 606 with respect to the rotational input device 602.

The rotary input display system 600 also includes a control assembly 612 that is coupled to the rotational input device 602. The control assembly 612 is configured to acquire the position signals from the sensors and to supply the acquired signals to a processor 614 of the system. By way of example, the control assembly 612 may include an application-specific integrated circuit (ASIC) that is configured to monitor the signals from the sensors to compute the angular location and direction (and optionally speed and acceleration) from the monitored signals and to report this information to the processor 614.

The processor 614 is coupled between the control assembly 612 and the display screen 604. The processor 614 is configured to control display of information on the display screen 604. In one sequence, the processor 614 receives angular motion information from the control assembly 612 and then determines the next items of the media list 611 that are to be presented on the display screen 604. In making this determination, the processor 614 can take into consideration the length of the media list 611. Typically, the processor 614 will determine the rate of movement such that the transitioning to different items in the media list 611 can be performed faster when moved at greater speeds. In effect, to the user, the more rapid the rotational motion or acceleration, the faster the transitioning through the list of media items 611. Alternatively, the control assembly 612 and processor 614 may be combined in some embodiments.

Although not shown, the processor 614 can also control a buzzer to provide audio feedback to a user. The audio feedback can, for example, be a clicking sound produced by a buzzer 616. In one embodiment, the buzzer 616 is a piezoelectric buzzer. As the rate of transitioning through the list of media items increases, the frequency of the clicking sounds increases. Alternatively, when the rate of transitioning slows, the frequency of the clicking sounds correspondingly slows. Hence, the clicking sounds provide audio feedback to the user as to the rate in which the media items within the list of media items are being traversed.

The various aspects or features of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that a user is able to traverse through a displayed list of items (e.g., media items) using a rotational user input action. Another advantage of the invention is that a user is able to easily and rapidly traverse a lengthy list of items (e.g., media items).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A media device comprising:
   an input surface configured to respond to curvilinear motion of a digit relative to the surface and in continuous contact with the surface, and
   a display operably associated with the input surface, the display configured to display a portion of a list of items and to enable linear continuous scrolling through the list of displayed items in response to the curvilinear motion of the digit relative to the surface through 360 degrees of curvilinear motion, wherein the portion of the list of displayed items changes as the user scrolls through the portion of the list of displayed items.

2. A method comprising:
   curvilinearly moving a digit relative to an input surface and in continuous contact with the input surface,
   operably associating the input surface and a display configured to display a portion of a list of items and to enable linear continuous scrolling through the list of displayed items in response to the curvilinear motion of the digit relative to the surface through 360 degrees of curvilinear motion, wherein the portion of the list of displayed items changes as the digit is moved relative to the input surface, and
   linearly scrolling through the list of displayed items.

3. A method comprising:
   curvilinearly moving a digit relative to an input surface and in continuous contact with the input surface,
   operably associating the input surface and a display configured to display a portion of a list of items and to enable linear continuous scrolling through the list of displayed items in response to the curvilinear motion of the digit relative to the surface through 360 degrees of curvilinear motion, wherein the portion of the list of displayed items changes as the digit is moved relative to the input surface, and
   identifying and selecting the displayed items.

4. A method comprising:
   curvilinearly moving a digit relative to an input surface and in continuous contact with the input surface,
   operably associating the input surface and a display configured to display a portion of a list of items and to enable linear continuous scrolling through the list of displayed items in response to the curvilinear motion of the digit relative to the surface through 360 degrees of curvilinear motion, wherein the portion of the list of displayed items changes as the digit is moved relative to the input surface, and
   identifying and selecting stored media associated with a media device.

5. A portable media device comprising:
   an input surface configured to respond to rotational motion of a finger or stylus relative to the surface and in continuous contact with the surface, and
   a display operably associated with the input surface, the display configured to display a portion of a list of items and to enable linear continuous scrolling through the list of displayed items in response to the curvilinear motion of the finger or stylus relative to the surface through 360 degrees of curvilinear motion, wherein the portion of the list of displayed items changes as the user scrolls through the portion of the list of displayed items.

6. A method comprising:
   rotationally moving a finger or stylus relative to an input surface through 360 degrees of curvilinear motion while in continuous contact with the input surface,
   operably associating the input surface and a display configured to display a portion of a list of items, and
   linearly continuously scrolling through the displayed portion of the list of items, wherein the portion of the list of displayed items changes as the finger or stylus is moved relative to the input surface.

7. A method comprising:
   rotationally moving a finger or stylus relative to an input surface through 360 degrees of curvilinear motion while in continuous contact with the input surface,
   operably associating the input surface and a display configured to display items, and
   continuously moving displayed items across a viewing area of the display as the finger or stylus is moved relative to the input surface so that at least a new item is brought into the viewing area.

8. A method comprising:
   rotationally moving a finger or stylus relative to an input surface through 360 degrees of curvilinear motion while in continuous contact with the input surface,
   operably associating the input surface and a display configured to display items, and
   changing displayed items in a viewing area of the display as the finger or stylus is moved relative to the input surface so that different items are displayed in the viewing area.

9. A portable media device comprising:
   an input surface configured to respond to rotational motion of a finger or stylus relative to the surface through 360 degrees of curvilinear motion while in continuous contact with the surface, and
   a display operably associated with the input surface, the display having a viewing area in which new items may be introduced or removed from the viewing area in response to rotational motion of a finger or stylus relative to the input surface.

10. A method comprising:
    establishing continuous contact between a finger or stylus and an input surface,
    rotationally moving the finger or stylus relative to the input surface through 360 degrees of curvilinear motion while in continuous contact with the input surface,
    operably associating the input surface and a display configured to display items, and
    linearly scrolling through the displayed items while continuous contact is established between the finger or stylus and the input surface.

11. A portable media device comprising:
    a fixed input surface configured to respond to rotational motion of a finger or stylus relative to the surface through 360 degrees of curvilinear motion while in continuous contact with the surface, and
    a display operably associated with the input surface, the display configured to display a portion of a list of items and to enable linear scrolling through the displayed portion of the list of items while continuous contact is established between the finger or stylus and the input surface, wherein the portion of the list of displayed items changes as the finger or stylus is moved relative to the input surface.

12. A portable media device comprising:
    an input surface having a first dimension and a second dimension, the input surface configured to respond to rotational motion, relative to the first and second dimensions, of a finger or stylus in continuous contact with the surface through 360 degrees of rotational motion, and a display operably associated with the input surface, the display configured to display a portion of a list of items and to enable linear continuous scrolling through the displayed portion of the list of items, wherein the portion of the list of displayed items changes as the finger or stylus is moved relative to the input surface.

* * * * *